UNITED STATES PATENT OFFICE.

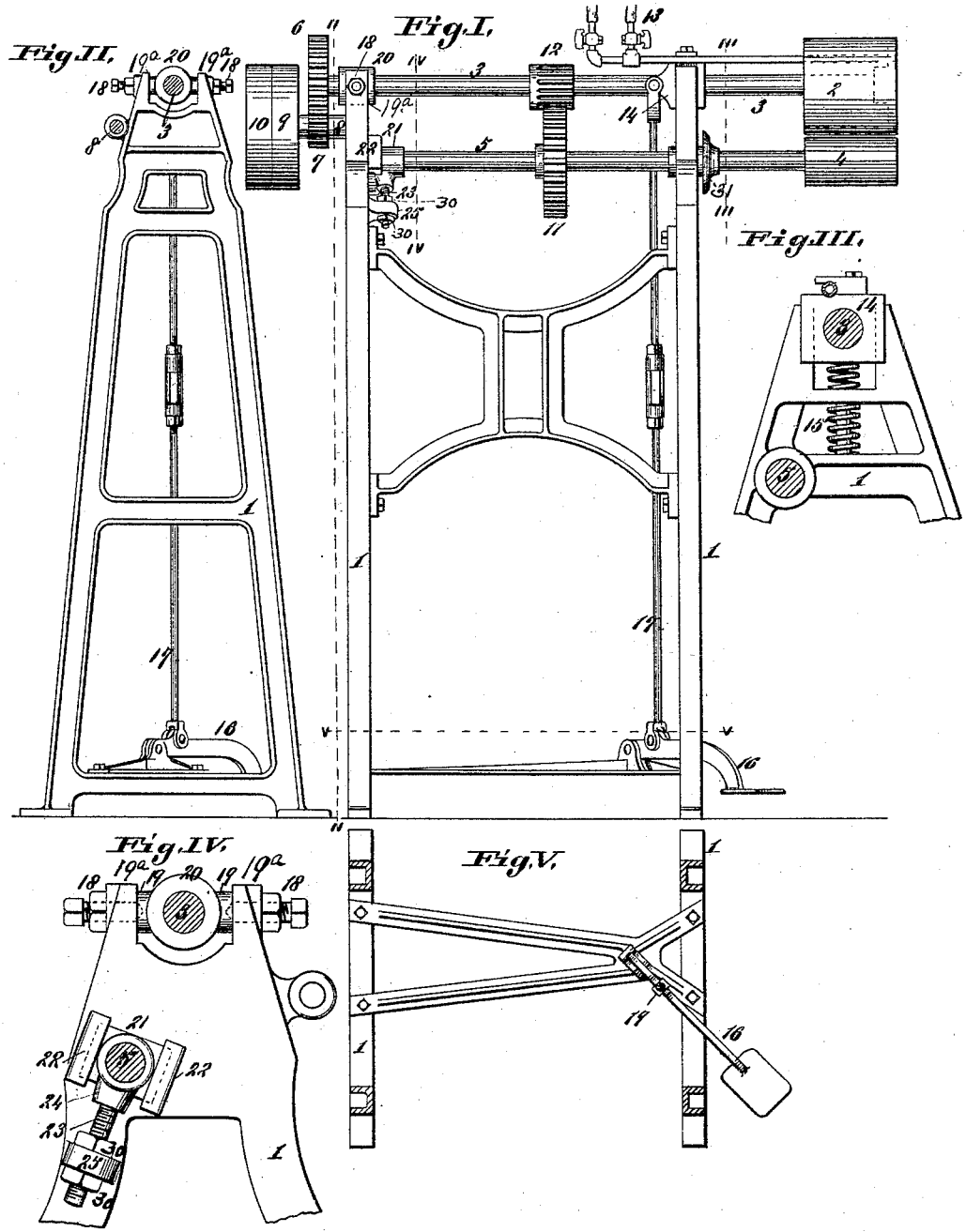

GEORGE J. FRITZ, OF ST. LOUIS, MISSOURI.

IRONING-MACHINE.

SPECIFICATION forming part of Letters Patent No. 458,893, dated September 1, 1891.

Application filed December 24, 1889. Serial No. 334,830. (No model.)

*To all whom it may concern:*

Be it known that I, GEORGE J. FRITZ, of the city of St. Louis, in the State of Missouri, have invented a certain new and useful Improvement in Ironing-Machines, of which the following is a full, clear, and exact description, reference being had to the accompanying drawings, forming part of this specification.

My present invention relates to that class of ironing-machines shown and described in the patent issued to me on the 28th day of August, 1888, No 388,660; and it consists in features of novelty hereinafter fully described, and pointed out in the claim.

Figure I is a front view of my improved machine. Fig. II is a side elevation with the shafts in section, taken on line II II, Fig. I. Fig. III is an enlarged section taken on line III III, Fig. I. Fig IV is an enlarged section taken on line IV IV, Fig. I. Fig. V is a horizontal section taken on line V V, Fig. I.

Referring to the drawings, 1 represents the frame of the machine.

2 represents the upper ironing-roller secured to a shaft. 3 and 4 represent the lower ironing-roller secured to a shaft 5 below and to one side of shaft 3. The shaft 3 is provided with a cog-wheel 6, meshing into a pinion 7, secured to a short shaft 8, provided with a driving-pulley 9 and a loose pulley 10. The shaft 5 is provided with a cog-wheel 11, meshing into an elongated pinion 12, secured to the shaft 3, and by means of this gearing the rollers 2 and 4 are turned.

13 represents the heating device of the roller 2. The inner box 14 of the shaft 3 is supported on a spring 15, (see Fig. III,) the spring acting to hold the roller 2 away from the roller 4, except when the box 14 is pulled downward against the action of the spring 15.

The box is pulled down against the action of the spring 15 when desired by means of a treadle 16 and a connecting-rod 17, pivoted to the treadle and extending along the inner side of one end of the frame and alongside shaft 5. In order to permit the shaft 3 to rise and fall with the box 14, or, in other words, to permit the box 14 to be moved vertically without being interfered with by the shaft, I pivot the outer end of the shaft to the frame 1 by means of bolts 18, (see Figs. I, II, and IV,) which pass through the frame 1 and fit in the outer ends of necks 19, formed upon or secured to the box 20, in which the outer end of the shaft 3 is journaled, the ends of said necks being close up to the lugs 19ª of the frame. It will thus be seen that the inner end of the shaft 3, carrying the roller 2, can be raised and lowered, with the bolts 18 acting as a pivot for the shaft. Of course this movement is very slight and it does not interfere with the gearing of the shaft. In order to tilt the roller 4 to correspond with the inclination of the roller 2 when in its working position, I journal the outer end of the shaft 5 in a sliding box 21, held to the frame 1 by lips or flanges 22 on the inner side of one end of the frame. (See Fig. IV.)

23 represents a bolt fitting in an extension 24 of the box 21 and which passes through lugs 25 of the frame 1. (See Fig. IV.) This bolt has nuts 30. It will be seen that by turning the nuts 30 in a proper direction the box 21 will be moved up or down at its outer end, and thus the inclination of the roller 4 will be effected as desired.

31 designates a collar on the shaft 5, which prevents the goods being ironed from touching the bearing of the shaft, thereby preventing the oil from the bearing getting on the goods.

I claim as my invention—

In an ironing-machine, the combination of the shafts 3 and 5, provided with rollers 2 and 4, and a collar on the shaft 5 to protect the goods being ironed, substantially as and for the purpose set forth.

GEO. J. FRITZ.

In presence of—
  E. S. KNIGHT,
  A. M. EBERSOLE.